(12) United States Patent
Leavy et al.

(10) Patent No.: US 10,911,431 B2
(45) Date of Patent: Feb. 2, 2021

(54) LOCAL ENCRYPTION FOR SINGLE SIGN-ON

(71) Applicant: Wickr Inc., San Francisco, CA (US)

(72) Inventors: Thomas Michael Leavy, River Edge, NJ (US); Joël Alwen, Vienna (AT); Christopher Howell, Freehold, NJ (US)

(73) Assignee: Wickr Inc., Pleasanton, CA (US)

( * ) Notice: Subject to any disclaimer, the term of this patent is extended or adjusted under 35 U.S.C. 154(b) by 221 days.

(21) Appl. No.: 16/106,862

(22) Filed: Aug. 21, 2018

(65) Prior Publication Data
US 2019/0356650 A1    Nov. 21, 2019

Related U.S. Application Data

(60) Provisional application No. 62/674,193, filed on May 21, 2018.

(51) Int. Cl.
*H04L 29/06* (2006.01)
*H04L 9/08* (2006.01)
(Continued)

(52) U.S. Cl.
CPC ........ *H04L 63/0815* (2013.01); *G06F 21/602* (2013.01); *H04L 9/085* (2013.01);
(Continued)

(58) Field of Classification Search
CPC ... H04L 63/0815; H04L 9/085; H04L 9/3226; H04L 9/0894; H04L 9/3213;
(Continued)

(56) References Cited

U.S. PATENT DOCUMENTS 6,662,299 B1 * 12/2003 Price, III ............... G06F 21/31
                                                                    713/171
9,455,968 B1 *  9/2016 Machani ............... H04W 12/04
(Continued)

OTHER PUBLICATIONS

N. Sullivan et al. Hashing to Elliptic Curves. Mar. 5, 2018.
(Continued)

*Primary Examiner* — Matthew Smithers
(74) *Attorney, Agent, or Firm* — Banner & Witcoff, Ltd.

(57) ABSTRACT

The present disclosure describes techniques that allow for a client-side application, located on a first client device, to generate a random encryption key and encrypt locally-stored application data with the random encryption key. In order to ensure that the client-device application is unable to decrypt the locally-stored encrypted application data prior to authenticating with an external authentication source (i.e., SSO, IdP), the client-side application divides the random encryption key into at least a first share and a second share according to a secret sharing algorithm. The first share is transmitted to a trusted third party, while the second share is encrypted locally and stored in a secure location on the client device. Upon successful authentication, the trusted third party returns the second share to the first client device. The client-side application derives the random encryption key and decrypts the locally-stored encrypted application data to be used by the client-side application. By dividing the key used to encrypt the client-side application data and storing one of the secret shares necessary to deriving the key at a trusted third party, the present disclosure solves the problem of how to encrypt local application data when the login credentials for the application are managed by a trusted third party, such as an SSO system.

20 Claims, 10 Drawing Sheets

(51) Int. Cl.
 *H04L 9/32* (2006.01)
 *G06F 21/60* (2013.01)
(52) U.S. Cl.
 CPC .......... *H04L 9/0894* (2013.01); *H04L 9/3213* (2013.01); *H04L 9/3226* (2013.01)
(58) Field of Classification Search
 CPC .................. H04L 9/0891; H04L 9/0662; H04L 2463/061; H04L 63/0428; H04L 63/06; G06F 21/602; G06F 21/33
 See application file for complete search history.

(56) References Cited

U.S. PATENT DOCUMENTS

| | | | | |
|---|---|---|---|---|
| 10,289,835 | B1* | 5/2019 | Machani | G06F 21/6209 |
| 2003/0147536 | A1 | 8/2003 | Andivahis et al. | |
| 2010/0131755 | A1* | 5/2010 | Zhu | H04L 63/0815 |
| | | | | 713/155 |
| 2013/0290719 | A1* | 10/2013 | Kaler | H04L 63/0435 |
| | | | | 713/168 |
| 2014/0189781 | A1* | 7/2014 | Manickam | H04W 12/08 |
| | | | | 726/1 |
| 2016/0180076 | A1* | 6/2016 | Katieb | H04L 63/0815 |
| | | | | 726/6 |
| 2016/0285858 | A1* | 9/2016 | Li | H04L 63/0815 |
| 2017/0275752 | A1* | 9/2017 | Yamashita | G01J 3/42 |
| 2018/0083952 | A1* | 3/2018 | Gummididala | H04L 9/321 |
| 2018/0176222 | A1* | 6/2018 | Bhaskar | H04L 63/0815 |

OTHER PUBLICATIONS

N. Sullivan et al. Verifiable Oblivious Pseudorandom Functions (VOPRFs). Mar. 5, 2018.

T. Dierks et al. RFC 4346—The Transport Layer Security (TLS) Protocol Version 1.1. Apr. 2006.

* cited by examiner

LOCAL ENCRYPTION FOR SINGLE SIGN-ON

CROSS-REFERENCE TO RELATED APPLICATIONS

This application claims priority to U.S. Provisional Application No. 62/674,193, entitled, "Local Encryption for Single Sign-On," filed May 21, 2018, the entirety of which is herein incorporated by reference. This application is also related to U.S. application Ser. No. 16/106,848, entitled, "Local Encryption for Single Sign-On," filed Aug. 21, 2018, the entirety of which is herein incorporated by reference.

BACKGROUND OF THE INVENTION

Figure 1A:
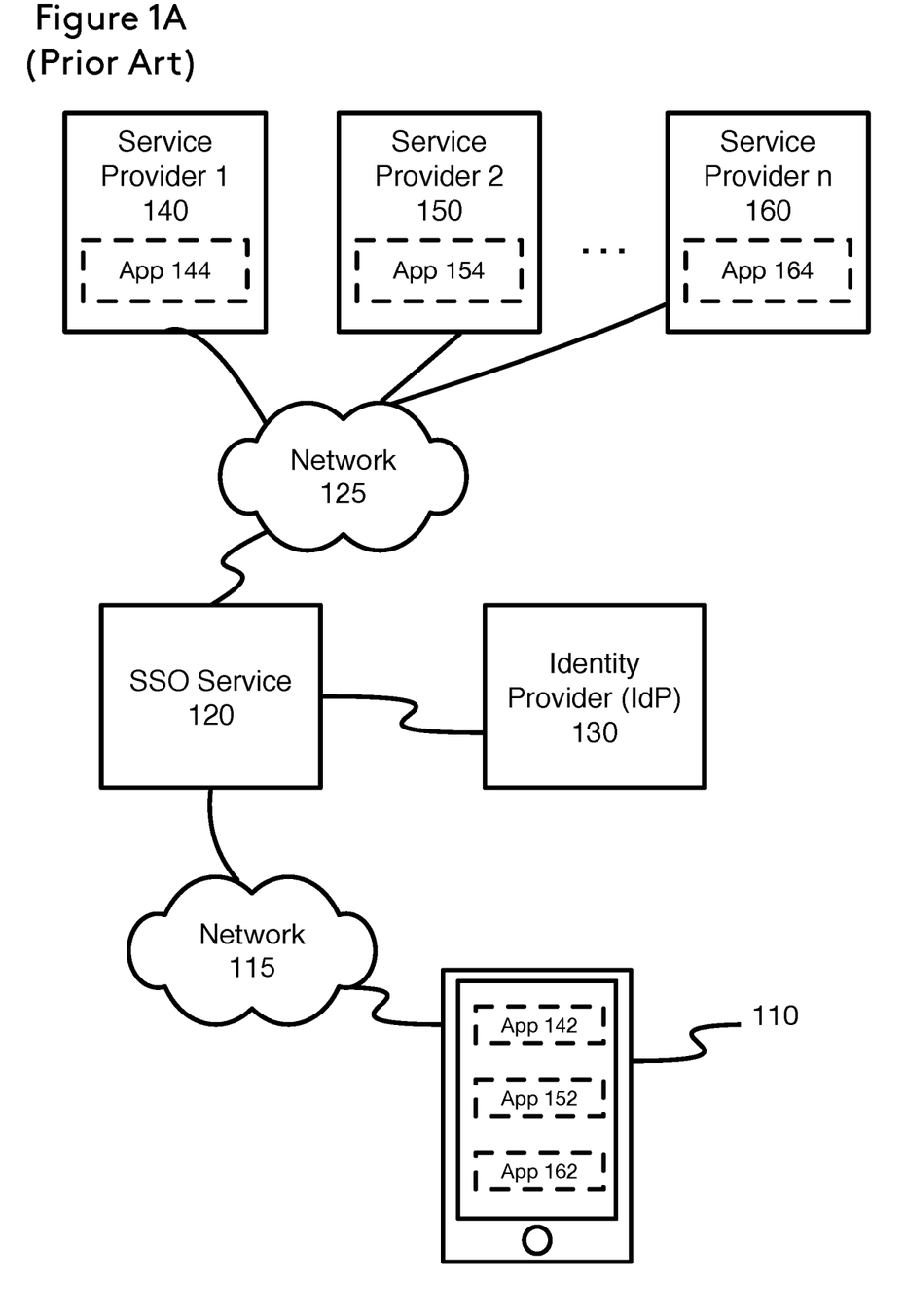
FIGS. 1A and 1B illustrate prior art examples of an SSO environment and logging-in and accessing one or more services using an SSO system.

Single Sign-On ("SSO") is a useful tool that allows users to use a single set of credentials to access a plurality of services, such as e-mail, messaging, office productivity (i.e. Microsoft® Office), and other applications and/or services. FIG. 1A shows a prior art example of an SSO arrangement.

In FIG. 1A, a first device 110, that includes a first client-side application 142, a second client-side application 152, and a third client-side application 162, connects to an SSO system 120 via network 115. SSO system 120 is connected to an identity provider ("IdP") 130. While SSO system 120 and IdP 130 are depicted as separate entities, one of ordinary skill in the art would recognize that the two services could be co-located on the same physical device or logically deployed in the same cloud environment. SSO 120 connects to a first service provider 140, a second service provider 150, and a third service provider 160 (collectively "the service providers"), each with their own server-side application (i.e., 144, 154, 164), via network 125. The service providers may either be located in a separate cloud service, the same network environment as SSO 120 and IdP 130, or any combination thereof.

Figure 1B:
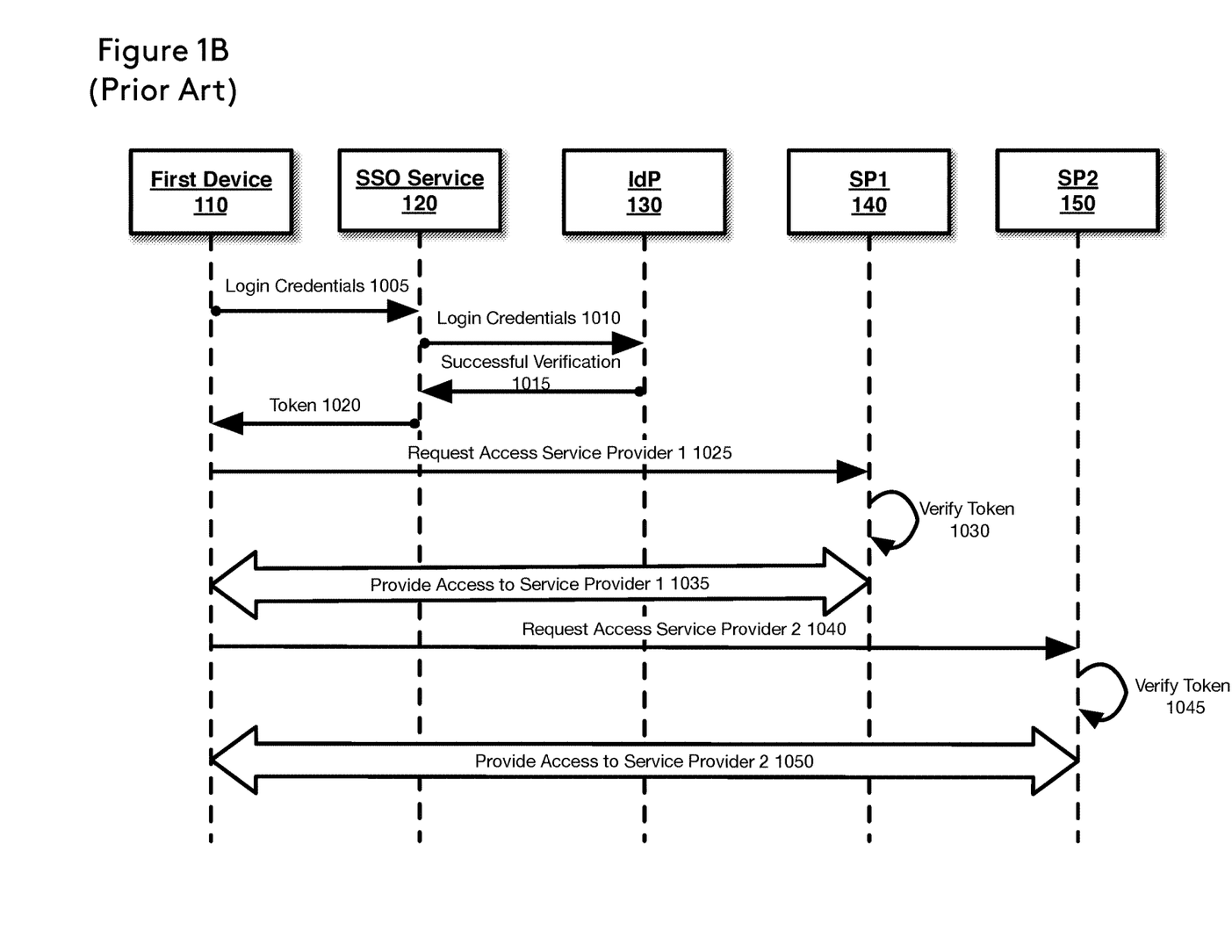

To make use of the various services and applications available through the SSO, the user of first device 110 authenticates the user's login credentials and provides access to the various server-side applications. FIG. 1B illustrates an exemplary process of an enterprise user accessing the plurality of services via SSO. The first device 130 begins at step 1005 by providing login credentials (i.e., a username and password of first user) to SSO system 120. SSO system 120 communicates with IdP 130, which includes directory services—such as Active Directory ("AD") or Lightweight Directory Access Protocol ("LDAP"), to authenticate the received login credentials in step 1010. When the login credentials are invalid, IdP 130 provides SSO system 120 with an indication that credentials are invalid and SSO system 120 denies the login request. However, when the login credentials are valid, IdP 130 provides SSO system 120 with an indication of the successful authentication in step 1015. SSO system 120, in turn, provides first device 110 with a token or certificate to access the plurality of services in step 1020. In lieu of a token or certification, SSO system 120 may act as a portal that hosts the plurality of services in some embodiments.

Once first device 110 has the token, first device 110 uses the token to access the plurality of services. For instance, in step 1025, first device 110 transmits the token to first service provider 140 ("SP1"). First service provider 140 verifies the token in step 1030. If the token is invalid, first service provider 140 provides first device 110 with access to the first server-side application 144 available via first service provider 140 in step 1035. This process can be repeated to access additional services, such as second service provider 150 ("SP2"). The token is transmitted in step 1040, verified in step 1045, and access is granted to the second server-side application 154 hosted by second service provider 150 when the token is valid.

This SSO arrangement has many benefits. For example, SSO allows network administrators to more easily manage user accounts by creating a single access point for adding and removing users. This makes onboarding and terminating employees quicker and more secure. Additionally, SSO reduces the effects of password fatigue—the pressure and exhaustion of remembering a multitude of passwords to access various services and resources.

While SSO includes a number of benefits, SSO includes a glaring security flaw when it comes to client-side application data on the first device. Namely, SSO makes it impractical for client-side application data to be encrypted with a key derived from a user's password. In this regard, services and/or applications that are run on the enterprise user's first device generate an encryption key by using the enterprise user's password as an input to a password-based key derivation function. The generated encryption key encrypts client-side application data related to one or more services and/or applications. With SSO in place, encryption based on the user's password is impracticable because the client-side portion of the service and/or application no longer has access to the password. Instead, the enterprise user accesses the service and/or application via a token or certificate. Thus, the client-side portion of the service/application cannot generate the encryption key needed to encrypt client-side application data. Accordingly, there is a technical problem of securely generating and storing an encryption key and encrypting client-side application data when enterprise users log-in via an external authentication source, like SSO or IdP.

BRIEF SUMMARY OF THE INVENTION

The present disclosure describes techniques that allow for a client-side application, located on a first client device, to generate a random encryption key and encrypt client-side application data with the random encryption key. The random encryption key is used in lieu of a password-derived encryption key.

In order to ensure that the client-side application is unable to decrypt the locally-stored encrypted application data prior to authenticating with an external authentication source (i.e., SSO, IdP), the client-side application divides the random encryption key into at least a first share and a second share according to a secret sharing algorithm. The first share is transmitted to a trusted third party, where the first share is stored securely until such time that the client-side application passes authentication and the trusted third party returns the first share to the client device. Meanwhile, the second share is encrypted locally and stored in a secure location on the client device.

Upon successful authentication, the trusted third party returns the second share to the client device. The client-side application derives the random encryption key and decrypts the encrypted client-side application data. The decrypted client-side application data is used by the client-side application to access the corresponding server-side application. By dividing the key used to encrypt the client-side application data and storing one of the secret shares necessary to deriving the key at a trusted third party, the present disclosure solves the problem of how to encrypt client-side application data when the login credentials for the application are managed by a trusted third party, such as an SSO system.

BRIEF DESCRIPTION OF THE DRAWINGS

Various embodiments of the invention are disclosed in the following detailed description and the accompanying drawings.

DETAILED DESCRIPTION

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The embodiments described herein with reference to the accompanying drawings, in which like reference numerals may refer to identical or functionally similar elements. Further, the terminology used herein is for the purpose of describing particular embodiments only and is not intended to be limiting of the disclosed embodiments. As used herein, the singular forms "a," "an," and "the" are included to include the plural forms as well, unless context clearly defines otherwise. It will be further understood that the terms "comprises" and/or "comprising," when used in the specification, specify the presence of stated features, integers, steps, operations, elements, and/or components, but do not preclude the presence of one or more additional features, integers, steps, operations, elements, and/or groups thereof.

Unless otherwise defined, all terms (including technical and scientific terms) used herein shall be given their plain and ordinary meaning as understood by one of ordinary skill in the art. It will be further understood that terms such as those defined in commonly used dictionaries, should be interpreted as having a meaning that is consistent with their meaning in the context of the relevant art and will not be interpreted in an idealized or overly formal sense unless expressly so defined herein.

The present invention may be embodied as a method, system, and/or as computer program instructions stored on a non-transitory computer-readable medium. Accordingly, the embodiments may take the form of hardware, software, or a combination thereof. Any suitable non-transitory computer-readable medium or processor-readable medium may be utilized including, for example, but not limited to, hard disks, USB Flash Drives, DVDs, CD-ROMs, optical storage devices, magnetic storage devices, etc. The instructions may be written in any suitable programming and/or scripting language, such as Java, C, C++, C #, Python, erlang, PHP, etc.

The disclosed embodiments are described, in part below, with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general-purpose computer, special-purpose computer, or other programmable data processing apparatus to produce a machine such that the instructions, which execute via the processor of the computer or other programmable data processing apparatus, create means for implementing the functions/acts specified in the block or blocks.

Note that the instructions described herein such as, for example, the operations/instructions and steps discussed herein, and any other processes described herein can be implemented in the context of hardware and/or software. In the context of software, such operations/instructions of the methods described herein can be implemented as, for example, computer-executable instructions such as program modules being executed by a single computer or a group of computers or other processors and processing devices. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, tablet computers, remote control devices, wireless handheld devices, Smartphones, mainframe computers, servers, and the like.

The term module, as utilized herein, may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code or machine code that actually implements the routines in the module. The term module may also simply refer to an application such as a computer program designed to assist in the performance of a specific task such as word processing, accounting, inventory management, etc. Additionally, the term "module" can also refer in some instances to a hardware component such as a computer chip or other hardware.

Alternatively, each block, and/or combinations of blocks, may be implemented by special purpose hardware, software, or firmware operating on special or general-purpose data processors, or combinations thereof. It should also be noted that, in some alternative implementations, the operations noted in the blocks may occur in an order different from the one indicated in the figures. For example, two blocks shown in succession may in fact be executed substantially concurrently, or the blocks may sometimes be executed in the reverse order, or the varying embodiments described herein can be combined with one another or portions of such embodiments can be combined with portions of other embodiments in another embodiment.

Figure 2:
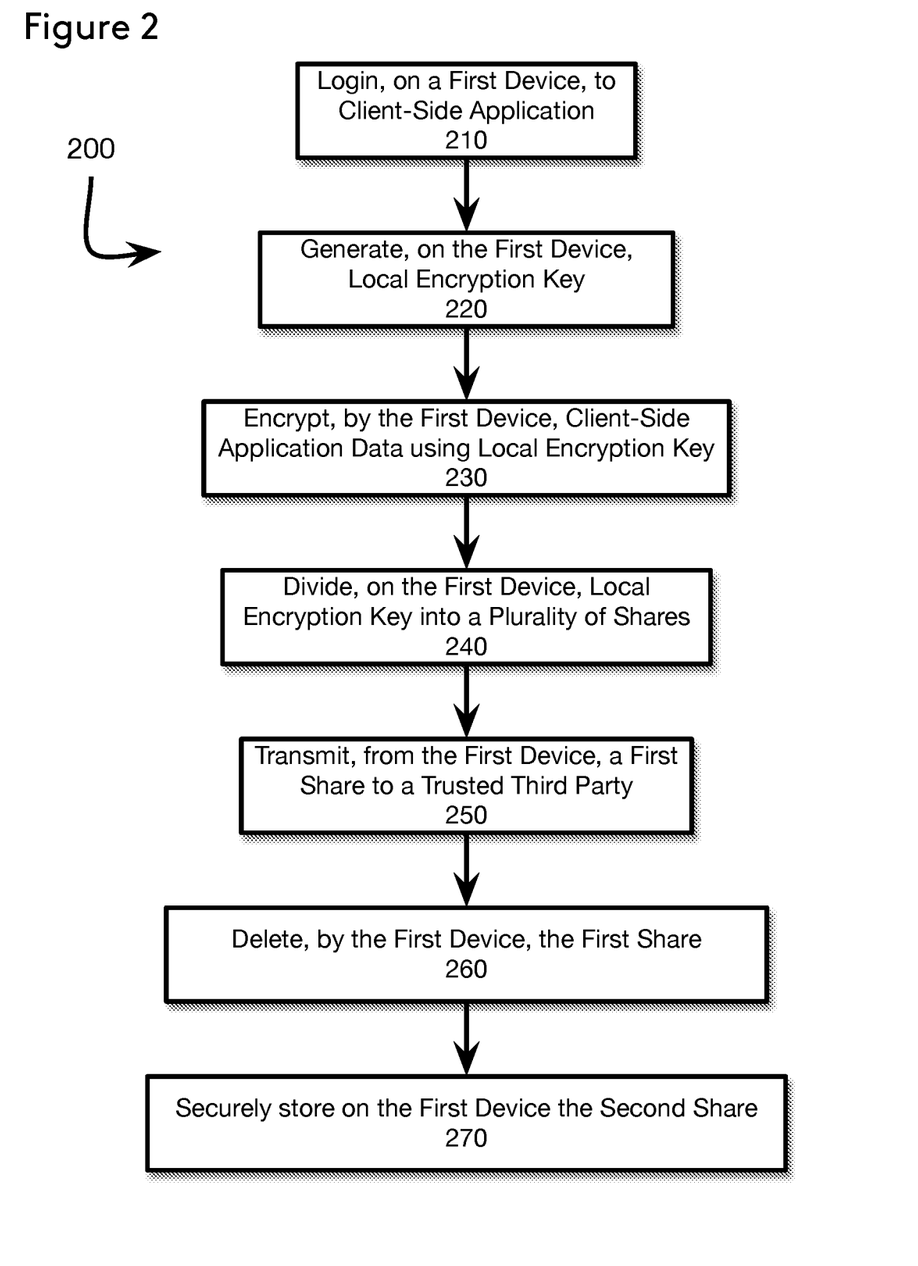
FIG. 2 illustrates an exemplary process for securing client-side application data stored on a first device in accordance with an embodiment of the disclosure.

When a new application is provisioned by an enterprise, user accounts are created in the server-side application directory based on entries in the user directory maintained by the identity provider ("IdP"). Users log in to the newly provisioned application using their login credentials (i.e. username and password). The first time that a user logs in to the new provisioned application, the client-side application generates a plurality of settings, preferences, and configurations. FIG. 2 illustrates an exemplary process 200, performed by a client-side application, to secure client-side application data stored on a first device in accordance with a first embodiment of the disclosure.

In block 210, process 200 begins, with a user logging-in to the client-side application on a first device. Logging-in to the client-side application includes providing login credentials, such as a username and password or certificate, to the client-side application. The client-side application transmits the login credentials to the SSO system, which authenticates the received login credentials. When the login credentials are invalid, the SSO system denies the login attempt. When the SSO system determines that the login credentials are valid, the SSO system provides an indication to the client-side application that the authentication was successful and connects the client-side application on the first device to the server-side application.

In an alternative embodiment, logging-in to the client-side application includes logging-in to the SSO system, which acts as a portal. The user provides his or her login credentials to the SSO system. When the login credentials are invalid, the SSO system denies the login attempt. However, when the login credentials are valid, the SSO system authenticates the user and displays a list of applications and services that the user is then allowed to access.

After the user's login credentials are validated, process 200 proceeds to block 220 where the client-side application, executing on a first device, generates a local encryption key. In preferred embodiments, the client-side application generates the local encryption key using a key derivation function (KDF). In order to generate the local encryption key, the KDF accepts a plurality of inputs, including, for example, the pseudorandom string of bits, ephemeral noise generated by the first device, a hardware signature of the first device, one or more serial numbers of one or more device components, or any combination thereof. Preferably, the plurality of inputs accepted by the KDF has an entropy of at least 256 bits.

After generating the local encryption key, the client-side application encrypts client-side application data using the local encryption key in block 230. The encrypted client-side application data is stored in a memory of the first device. The client-side application uses the local encryption key and a symmetric encryption algorithm to encrypt client-side application data. In preferred embodiments, the client-side application uses a symmetric key authenticated encryption algorithm with associated data (AEAD). An AEAD is preferable because an AEAD provides assurances as to the integrity and authenticity of the client-side application data, in addition to the confidentiality provided by the encryption. In alternative embodiments, a simple block cipher, such as the Advanced Encryption Standard (AES), the Data Encryption Standard (DES), Triple-DES (3DES), etc., is used to encrypt the client-side application data. Client-side application data includes, for example, a database associated with the client-side application, user information, personal identifying information (PII), communications received via the client-side application, or any combination thereof. In some embodiments, client-side application data includes a local database key such that the local encryption key is a key-encrypting key that is used to encrypt the local database key. Encrypting client-side application data ensures that client-side application data is secure. Thus, if the client device is ever compromised (i.e., stolen, lost, hacked, etc.), the encrypted client-side application data will be in an unusable state to the malicious actor.

To prevent a malicious actor from being able to recover the encrypted client-side application data, the client-side application protects the local encryption key by dividing the local encryption key into a plurality of shares in block 240. The local encryption key is divided according to a secret sharing algorithm. In preferred embodiments, the secret sharing algorithm is any linear secret sharing scheme. One example of a linear secret sharing scheme is an exclusive-OR (XOR) secret sharing scheme, which begins with the client-side application generating a random string. The random string is a first share. A Boolean operation, such as an XOR, is performed using the random string and the local encryption key to form the second share. An XOR secret sharing scheme produces the at least two shares faster and computationally more-efficient than other secret sharing algorithms. In another example, the linear secret sharing scheme is Shamir Secret Sharing Scheme. Shamir Secret Sharing Scheme allows for a more expressive threshold access structure by allowing for the reconstruction of the local encryption key using t out of n number of shares. That is, Shamir Secret Sharing Scheme allows for the reconstruction of the local encryption key with less than all of the shares. This allows for the local encryption key to be recovered in the event that one of the plurality of shares is unavailable, for example, due to the repository being unavailable. Both of these examples provide an elegant solution for updating secret shares, discussed in greater detail below, due to their commutative nature.

After generating the first and second shares, the first device transmits the first share to a trusted third party in block 250. In preferred embodiments, the first device encrypts the first share before transmitting to the trusted third party. In some examples, the first share is encrypted with a key derived according to Elliptic Curve Diffie-Hellman using a first ephemeral asymmetric key pair of the first device and a second ephemeral asymmetric key pair of the trusted third party. The trusted third party may be the SSO system, IdP, or other authentication service. Alternatively, the first share is encrypted according to a additively homographic encryption scheme, such as Paillier encryption scheme, before being transmitted to a trusted third party. In further embodiments, the trusted third party is a second device controlled by the same user as the first device. In embodiments where more than two shares are formed, one share is sent to a trusted third party and another share is sent to a second device controlled and trusted by a user of the first device. The first share is then deleted by the first device in block 260. Preferably, the first share is forensically deleted such that the first share cannot be recovered on the first device. In block 270, the second share is stored securely on the first device. Because the local encryption key is not recoverable with only the second share, the first device may store the second share unencrypted. Alternatively, the second share is encrypted using an encryption key belonging to the first user to provide an additional layer of security.

Figure 3:
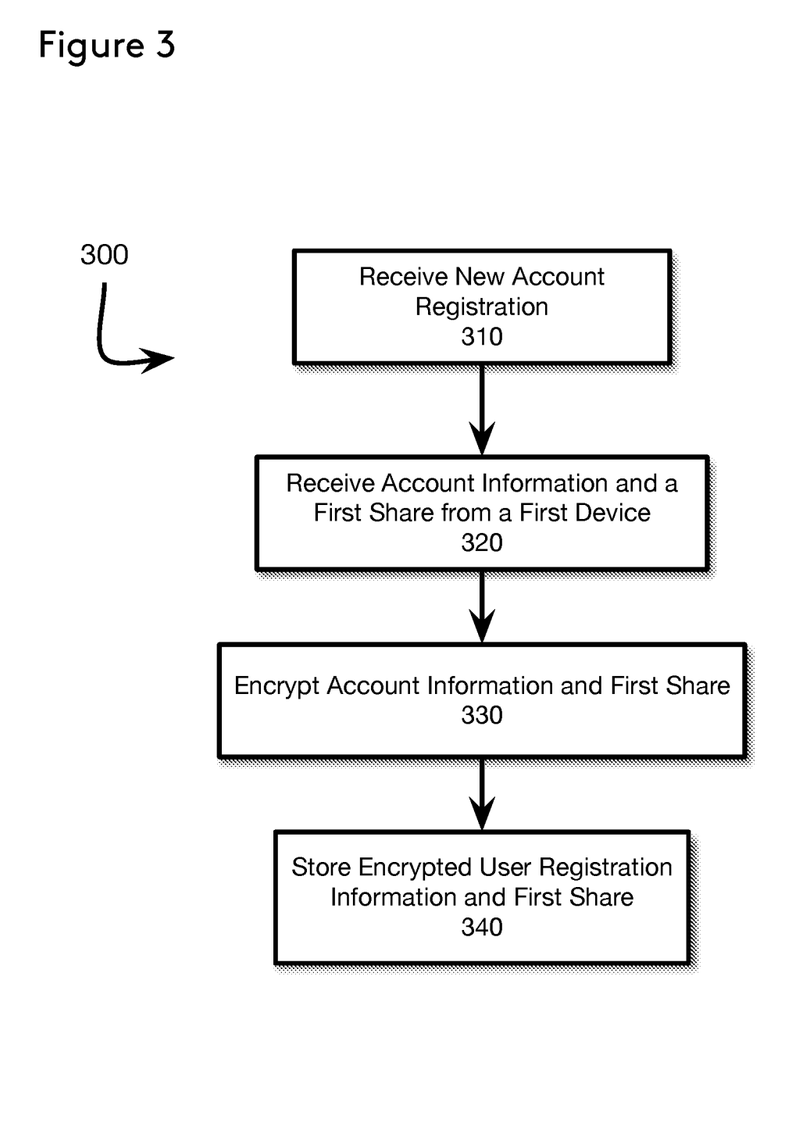
FIG. 3 illustrates a process for a server provisioning a new user account according to one embodiment of the present disclosure.

When a new user account is provisioned, the server-side application takes steps to enable the client-side application's access to the functionality of the server-side application. FIG. 3 illustrates a process 300 for a server provisioning a new user account.

In block 310, the server-side application receives a new account registration. In preferred embodiments, the server-side application requests account information from the IdP. For example, the server-side application requests a user directory or, alternatively, updates to the user directory. Alternatively, a system administrator adds and removes accounts manually. As part of the new account registration process, the server-side application creates a new database entry for the new account. The database is populated with data and information generated by the server-side application and data and information received from the IdP, a first device associated with the new account, or a combination thereof. For example, the IdP provides a username to the server-side application. It is important for the server-side application to keep an accurate account directory to keep unauthorized users from accessing the application.

In block 320, the server-side application receives account information and a first share from the first device. The account information includes information generated by the client-side application, such as at least one public signature verification key, an application identifier, etc. The first share is one of a plurality of pieces of information needed to regenerate the local encryption key on the first device. In block 330, the server-side application encrypts the account information and the first share. In block 340, the server-side application stores the encrypted user registration information and first share. In preferred embodiments, the encrypted registration information and first share are stored in the database entry created for the new account. Accordingly, the server-side application stores the encrypted registration information and distributes the registration information to one or more second devices that wish to communicate with the user of the first device. Additionally, the server-side application stores the first share and returns the first share to the first device upon successful authentication with the SSO system to allow the first device to derive the local encryption key and decrypt the client-side application data.

Figure 4:
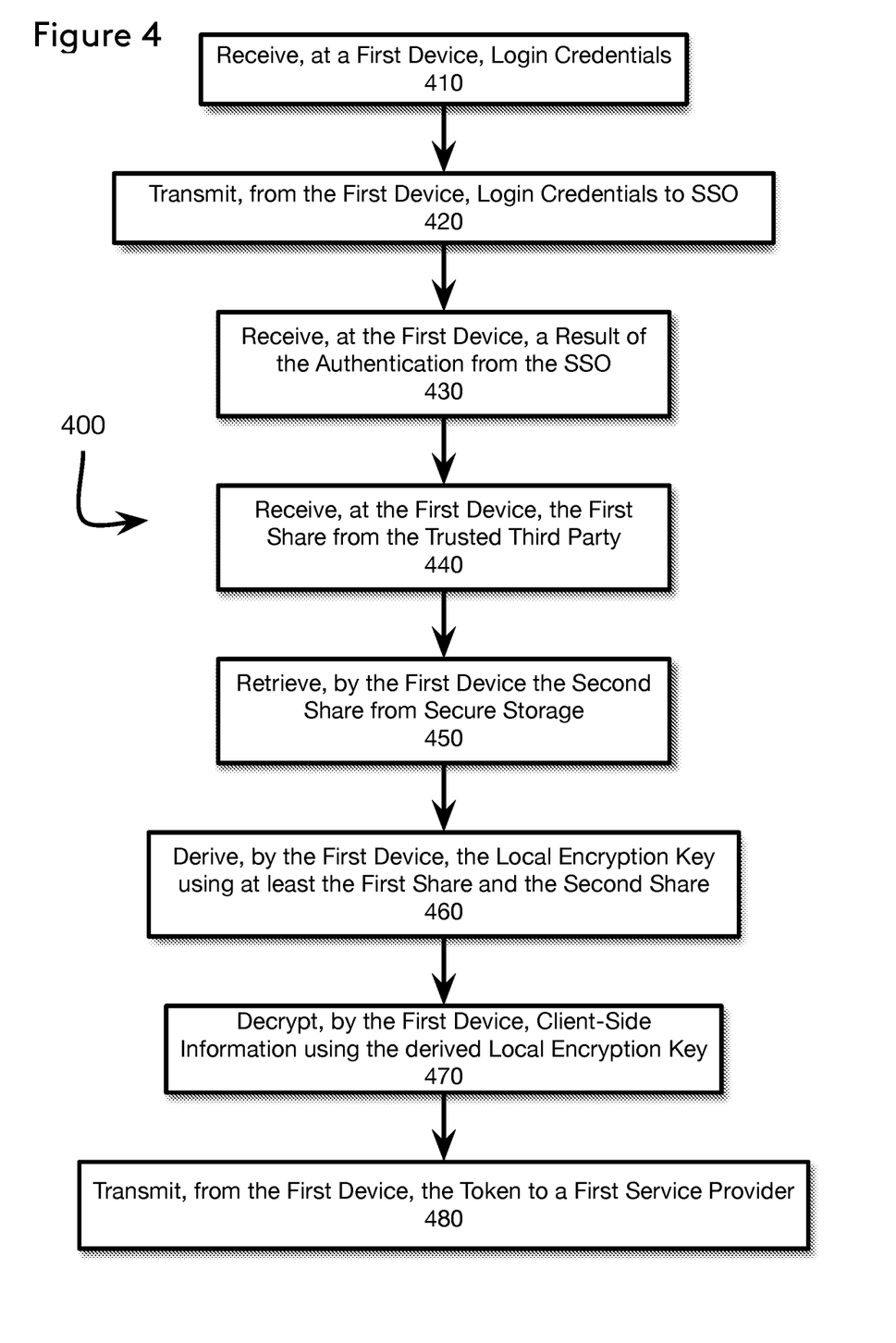
FIG. 4 shows a process for authenticating a first device and decrypting client-side application data according to one aspect of the disclosure.

After enrollment is completed, the first device authenticates itself with the SSO system and obtains a token to access one or more server-side applications, as well as a first share to derive the key needed to decrypt client-side application data. FIG. 4 shows an exemplary process 400 of first device authentication and decryption of client-side application data.

In block 410, the first device receives login credentials from a first user. In preferred embodiments, the login credentials are a username and password. Alternatively, the login credentials are either a physical token, such as an authentication key (i.e. USB authenticator token) or a smart card (i.e. a common access card), or a logical token, such as a certificate or random authentication string. In block 420, the login credentials are transmitted to the SSO system. Preferably, the login credentials are encrypted and then transmitted to the SSO over a secure channel, such as a network connection secured using Transport Layer Security (TLS) or Secure Socket Layer (SSL). In block 430, the first device receives a result of the authentication of the login credentials from the SSO system. When authentication fails, the first device receives notification of the failed login attempt. Failed login attempts may prompt the user of the first device to re-enter their login credentials or inform the user that he or she has exceeded a predetermined number of failed login attempts. When authentication is successful, the result includes a token that the first device uses to access the one or more server-side applications.

In block 440, the first device receives the first share from the Trusted Third Party. As noted above, the Trusted Third Party may be the SSO system, the IdP, a second device belonging to the user, or another trusted enterprise server. In preferred embodiments, the first share is encrypted by the Trusted Third Party prior to transmission to the first device. For example, the Trusted Third Party derives a one-time encryption key according to Elliptic Curve Diffie-Hellman key agreement protocol. The Trusted Third Party generates a first ephemeral asymmetric key pair and obtains a second ephemeral public key belonging to the first device. The second ephemeral public key is obtained from either the first device or a key distribution center (KDC). The Trusted Third Party derives the one-time encryption key using the first ephemeral private key and the second ephemeral public key. Once the one-time encryption key is derived and the first share is encrypted, the first ephemeral public key and an identifier associated with the second ephemeral public key are transmitted to the first device along with the encrypted first share. In addition to the additional security provided by encrypting the first share, this approach allows the first device to authenticate the identity of the Trusted Third Party. If the first device is able to generate the one-time encryption key using the received first ephemeral public key, the first device confirms that the Trusted Third Party holds the corresponding first ephemeral private key. In another example, the Trusted Third Party encrypts the first share using a public encryption key, such as an RSA public key, associated with the first device. The Trusted Third Party encrypts the first share using the public encryption key and an asymmetric encryption algorithm, such as RSA. Accordingly, the first device decrypts the received encrypted first share using the asymmetric encryption algorithm and the corresponding private encryption key held by the first device. While FIG. 4 illustrates the first share being transmitted separately from the authentication result, the first share and the authentication result may be transmitted in the same communication, or series of communications, to improve network performance by reducing the number of transmissions exchanged between the parties. Alternatively, the token is transmitted to the Trusted Third Party, which, in turn, transmits the first share to the first device.

In block 450, the first device retrieves the second share from a secure storage. In block 460, the first device derives the local encryption key using at least the first share received from the Trusted Third Party and the second share retrieved by the first device. The local encryption key is derived by combining the first share and the second share according to a secret sharing algorithm. As noted above, this may be as simple as XOR-ing the first share and the second share to derive the local encryption key. Alternatively, the local encryption key is derived according to one of the secret sharing algorithms discussed above. Once the local encryption key is derived, the client-side application forensically deletes the first share so that the local encryption key cannot be rederived to access the encrypted client-side application data. In block 470, the first device decrypts the client-side application data using the derived local encryption key. In preferred embodiments, client-side application data is decrypted according to a symmetric encryption algorithm. In alternative embodiments, the local encryption key decrypts a local database key, which, in turn, is used to decrypt encrypted client-side application data. Once the client-side application data is decrypted, the first device transmits the token to a first service provider in block 480. Accordingly, the client-side application accesses the corresponding functionality provided by the server-side application located on the first service provider. When the client-side application is closed, the client-side application re-encrypts client-side application data with the local encryption key and then forensically deletes the local encryption key.

Figure 5:
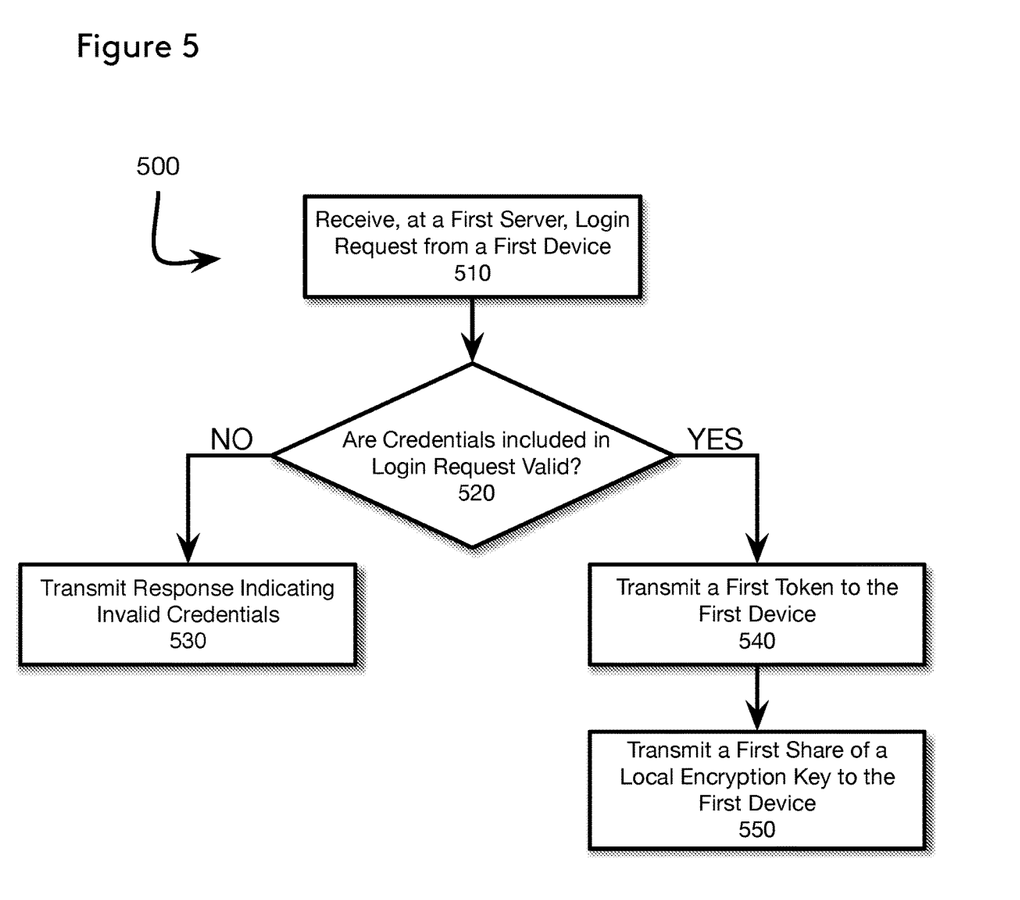
FIG. 5 illustrates an exemplary process for authenticating a first device and providing the first device with the first token and the first share.

FIG. 5 illustrates a process 500 for authenticating a first device and providing the first device with the first token and first share. In block 510, a first server receives a login request from a first device. In preferred embodiments, the first server is the SSO system and the login request includes login credentials. In block 520, the first server determines whether the login credentials included in the login request are valid. When the first server is the SSO system, the SSO system transmits the login credentials to the IdP. The IdP compares the received login credentials with login credentials stored in the IdP's directory. The result of the comparison (i.e., valid or invalid) is transmitted from the IdP to the SSO system. When the credentials are invalid, process 500 proceeds to block 530, wherein the first server transmits a response to the first device indicating that the login credentials are invalid. However, when the credentials are valid, process 500 proceeds to block 540, where the first server transmits a first token to the first device. The first token is capable of authenticating the first device to a plurality of service providers for a predetermined amount of time. In block 550, the first server transmits the first share of the local encryption key to the first device. As noted above, the first share may be transmitted in the same communication as the first token to improve the efficiency of the authentication process.

Figure 6:
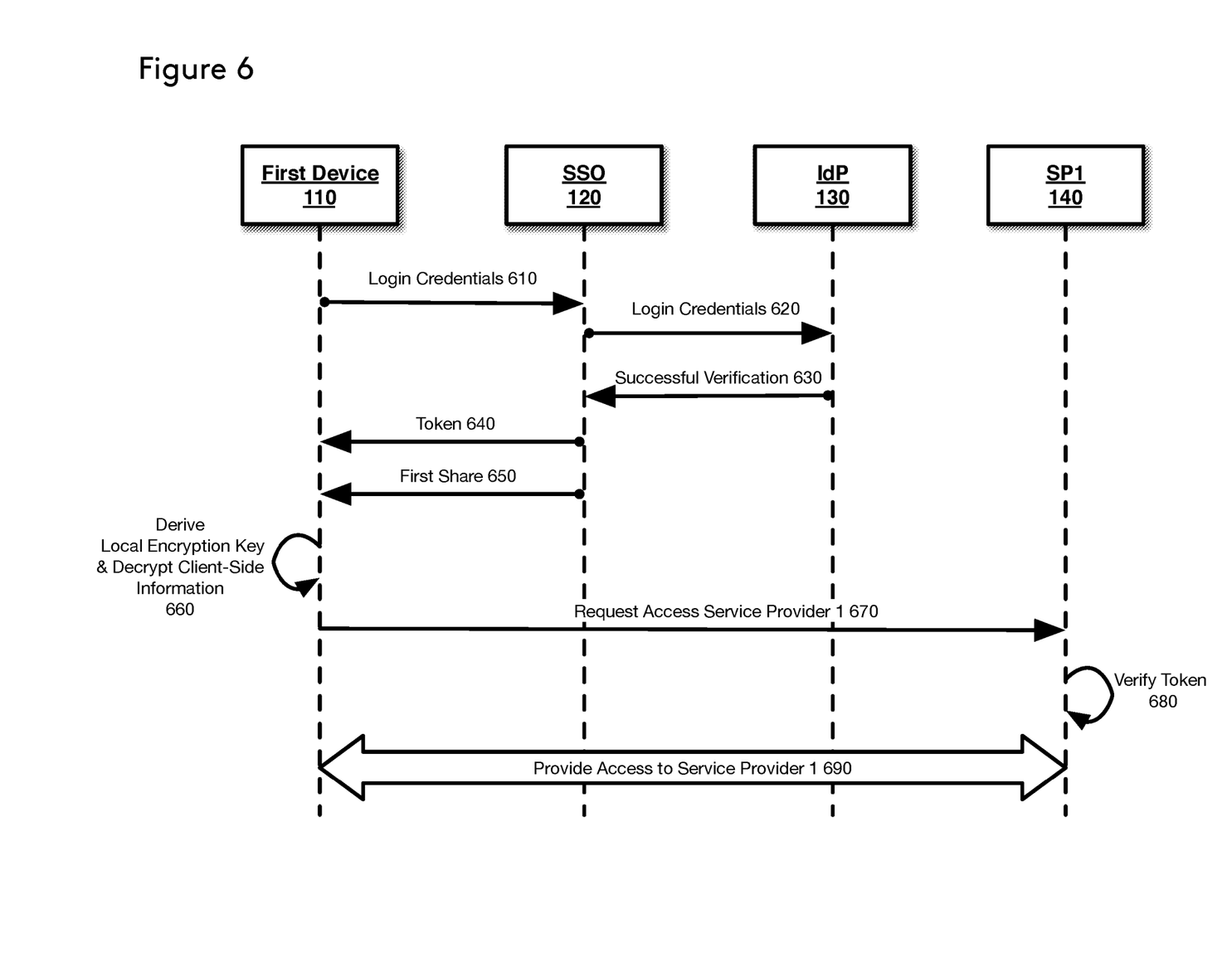
FIG. 6 shows a process for logging-in to an SSO system and accessing a first service provider.

Turning to FIG. 6, an exemplary exchange of information between the first device 110, the SSO system 120, the IdP 130, and the first service provider 140 is shown. In block 610, first device 110 transmits the login credentials to SSO system 120. SSO system 120 forwards the login credentials to IdP 130, who will perform the authentication check on the received login credentials. When the login credentials are valid, IdP 130 provides an indication of successful verification to SSO system 120 in block 630. Next, SSO system 120 transmits the first token to first device 110. Additionally, SSO system 120 transmits the first share to first device 110 in block 640.

In block 650, first device 110 derives the local encryption key using the first share and the second shared stored locally. Once derived, the local encryption key decrypts the client-side application data associated with an application. In block 670, first device 110 requests access to first service provider 140 by transmitting the first token received from the SSO system 120 to first service provider 140. First service provider 140 verifies the first token in block 680. In preferred embodiments, first service provider 140 checks the veracity of the received first token with either SSO system 120 or IdP 130. Alternatively, first service provider 140 coordinates an authentication key with IdP 130 prior to receiving the verification token. If the authentication key included in the token received from first device 110 is valid, first service provider 140 authenticates the first token received from first device 110. Once the token is verified, first service provider 140 provides first device 110 with access to the services and/or application available via the first service provider.

Figure 7:
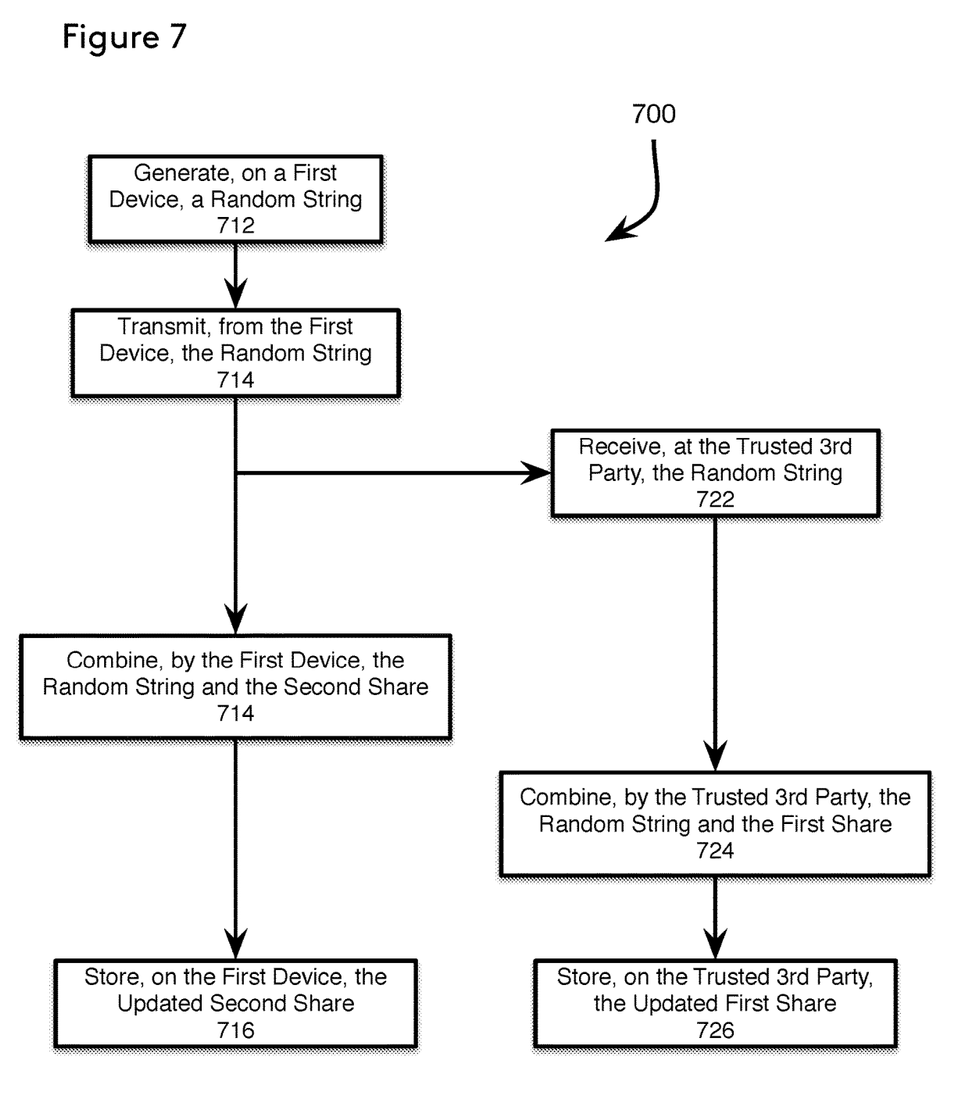
FIG. 7 shows a process for updating the plurality of shares according to one aspect of the disclosure.

From time-to-time, first device updates the first and second shares as a matter of proper security protocol. In this regard, the first and second shares can be updated without reconstructing the local encryption key during the update process. Further the first and second shares remain with their respective devices, reducing the likelihood that the first and second shares would be intercepted by an eavesdropper. However, even if an eavesdropper were to obtain one of the plurality of shares, the eavesdropper would be unable to reproduce the local encryption key without the other share and the stolen share would be rendered moot after the first and second shares were updated. Accordingly, FIG. 7 shows an exemplary process 700 for updating the plurality of shares that constitute the local encryption key.

In block 712, the share updating process begins by generating a random string on a first device. The random string is preferably generated using a PRNG. In block 714, the first device transmits the random string to the trusted third party. In block 722, the trusted third party receives the random string from the first device.

In block 714, the first device updates the second share stored thereon by combining the random string with second share. By combining the random string and the second share, the first device performs a Boolean operation using the random string and the second share to arrive at an updated second share. Similarly, the trusted third party updates the first share by performing the same XOR operation on the first share in block 724. Thus, the trusted third party forms an updated first share.

In block 716, the first device stores the updated second share. As noted above, the updated second share is stored in plaintext since the second share by itself cannot reproduce the local encryption key. In alternative embodiments, the updated second share is encrypted using an encryption key belonging to the first user to provide an additional layer of protection. Like the first device, the trusted third party stores the updated first share in block 726. Like the share stored on the first device, the updated first share can be stored in plaintext, since it is incapable of reproducing the local encryption key by itself.

While process 700 is discussed in the context of two shares, one of ordinary skill in the art would appreciate that any number of shares may be updated using the techniques discussed above and shown in FIG. 7. Further, process 700 allows shares of the local encryption key to be updated without having to update the local encryption key due to the commutative property of the Boolean operation. This is particularly useful in reducing the number of attack vectors bad actors have during the updating procedure. Further, the update procedure protects against eavesdroppers. Specifically, if an eavesdropper is able to obtain one of the shares, the update procedure described above and shown in FIG. 7 would render the share observed by the eavesdropper moot. Thus, the share updating process set forth above improves the performance of the client device by reducing the number of computational cycles associated with generating a new local encryption key.

Figure 8:
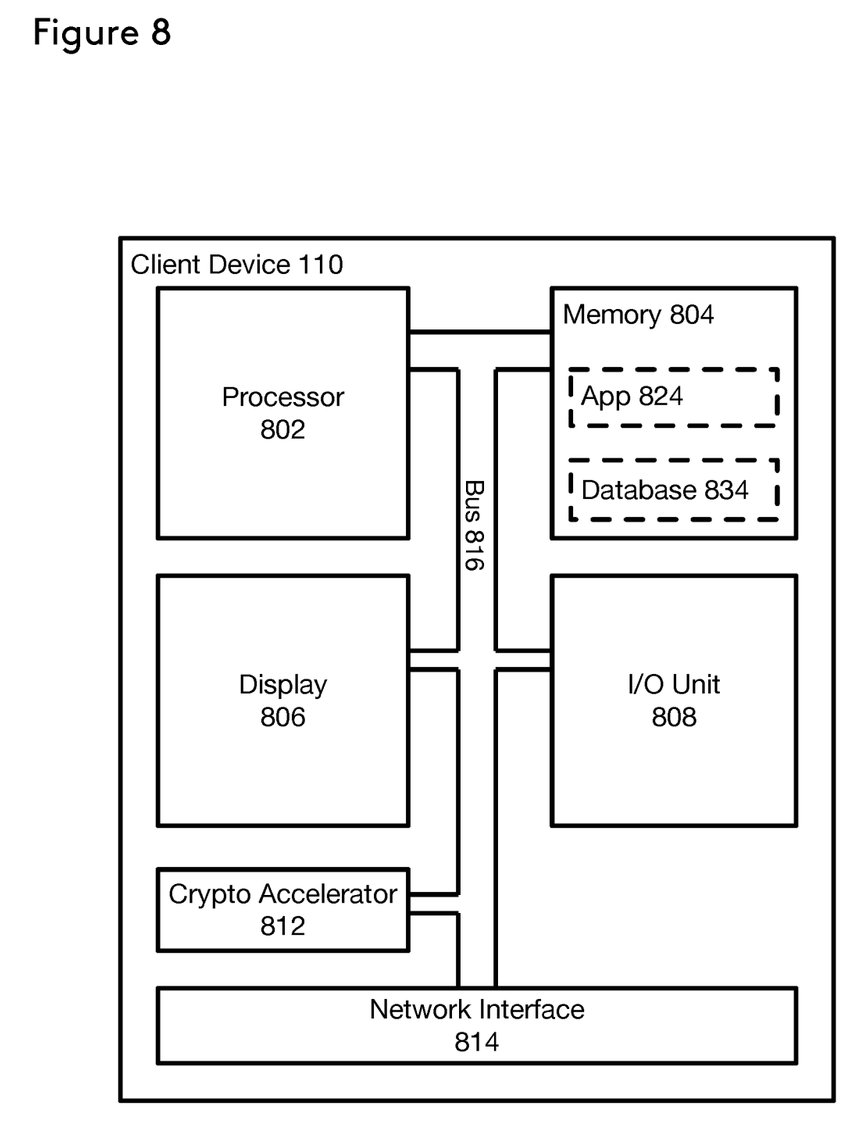
FIG. 8 illustrates an example of a client device in accordance with the present disclosure.

According to one embodiment, the client-side application is a secure collaboration application and the server-side application is the corresponding backend server functions to route communications and connect users. The client-side application executes on a client device, such as a mobile device, tablet, laptop computer, desktop computer, etc. FIG. 8 illustrates a client device 110 according to one aspect of the disclosure. In this regard, client device 110 includes at least a processor 802, a memory 804, a display 806, an I/O unit 808, a cryptographic ("crypto") accelerator 812, and a network interface 814 all interconnected by bus 816.

Processor 802 is any processor capable of interacting with the components of client device 110. For example, processor 802 may include a processor, multiprocessors, multicore processor, a dedicated controller, such as an ARM processor, an ASIC, or an FPGA, or any combination thereof. According to some examples, processor 802 is configured to generate a first encryption key, encrypt application data using the first encryption key, store the encrypted application data in a memory of the first device, divide the first encryption key into at least a first share and a second share, transmit at least one of the first share to a trusted third party, remove the at least one of the first share transmitted to the trusted third party; and store at least one of the second share in the memory of the first device. According to other embodiments, processor 802 is configured to perform the inverse operations to derive the local encryption key and decrypt the encrypted application data.

Memory 804 stores information accessible by processor 802, including instructions and data that may be executed or otherwise used by the processor 802 and/or crypto accelerator 812. For example, memory 804 stores instructions, such as client-side application 824. In preferred embodiments, client-side application 824 is a secure collaboration application that provides users with the ability to participate in voice and video calls, share encrypted content, exchange encrypted communications, and share application data. Accordingly, the processes described herein are performed by the secure collaboration application executing on the first and second devices. The first and second devices include a plurality of hardware. In operation, the secure collaboration application and the hardware of the first device operate in conjunction to perform the processes described herein.

Data stored by memory 804 includes database 834. In preferred embodiments, database 834 is encrypted via an encryption algorithm, such as Advanced Encryption Standard (AES), and a 256-bit key, referred to hereinafter as a local encryption key. In some examples, database 834 stores client-side application data related to secure collaboration application 824. For example, database 834 indexes information related to the secure collaboration application, such as key information (e.g. a user signing key, an application signing key, etc.), user information (e.g., username, application identifier, etc.), friend information, and communications. In this regard, communications transmitted and received by the secure collaboration application, including a message identifier, a hash of the sender's username, a hash of the sender's application identifier, a hash of the receiver's username, a hash of the receiver's application identifier, the communication encryption key, and a timestamp of each communication stored in database 834. According to some embodiments, memory 804 stores a plurality of ephemeral keys received from a second user that would allow the first and second user to exchange encrypted communication peer-to-peer. Accordingly, memory 804 may be any type of media capable of storing the above information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 804 may include short-term or temporary storage, as well as long-term or persistent storage.

Display 806 is any electronic device capable of visually presenting information. In mobile devices, such as smart phones and tablets, display 806 may be a touchscreen display. Accordingly, display 806 is integrated with I/O unit 808 to detect user inputs, as well as output data. In computing devices, display 806 may be an output, such as a VGA, DVI, or HDMI output, configured to connect to a monitor.

I/O unit 808 may be configured to receive input from a user and output data to the user. As noted above, the I/O unit 808 may work with touchscreen displays to receive input from a user. Alternatively, the I/O unit is an interface capable of interacting with input and output devices, such as keyboards, mice, monitors, printers, etc. Additionally, I/O unit 808 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 812 may be dedicated hardware, software, firmware, or any combination thereof that is configured to perform cryptographic operations, such as key generation, random number generation, encryption/decryption, signature generation, signature verification, etc. In preferred embodiments, crypto accelerator 812 is a dedicated processor configured to perform cryptographic operations on behalf of processor 802.

Network interface 814 may be dedicated hardware, software, firmware, or any combination thereof that is configured to connect client device 110 to one or more devices via a communication network. In this regard, network interface 814 may include various configurations and use various communication protocols including Ethernet, TCP/IP, ATM, cellular and wireless communication protocols (e.g. 802.11, LTE), instant messaging, HTTP and SMTP, and various combinations of the foregoing.

Figure 9:
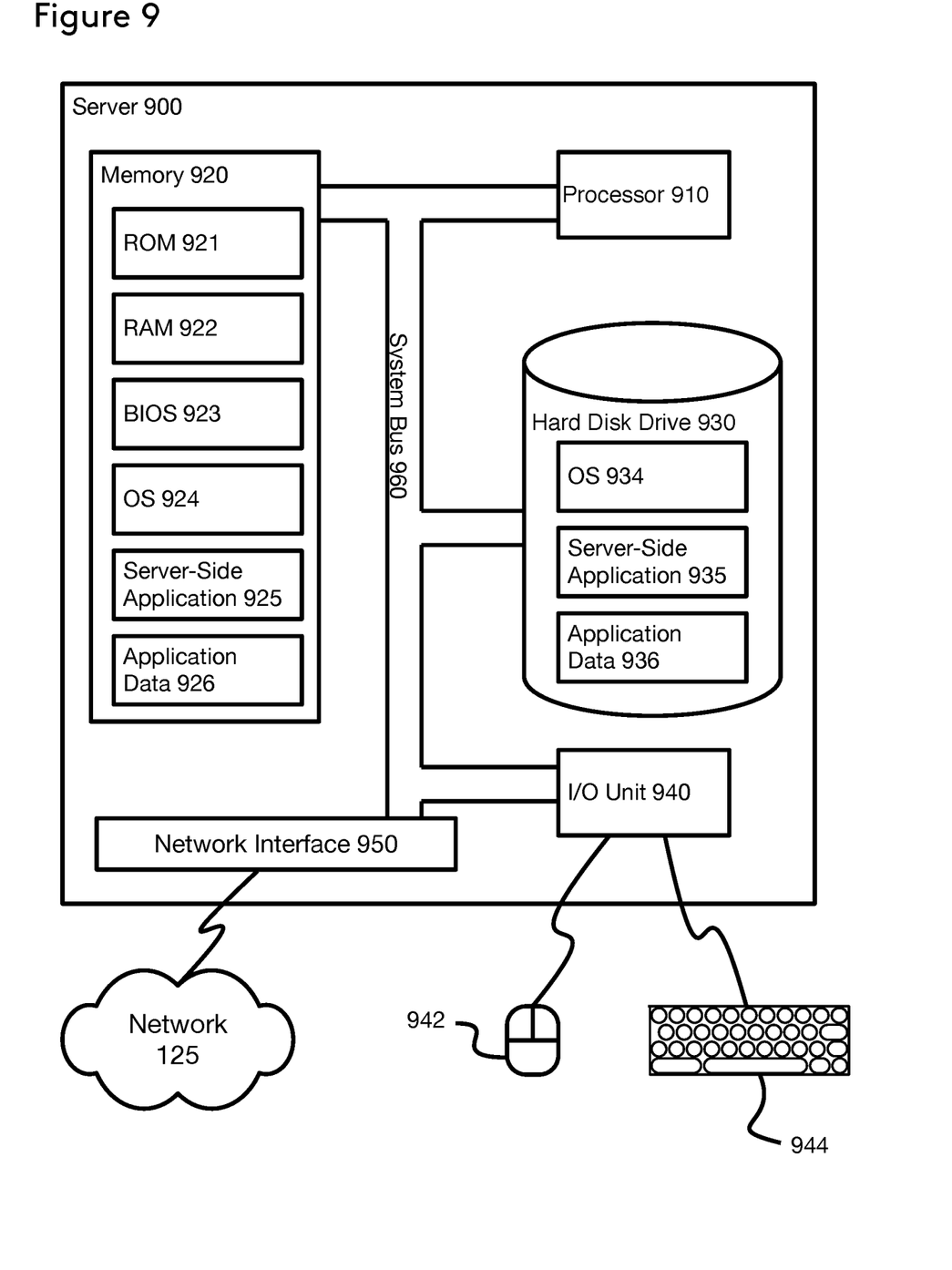
FIG. 9 illustrates an example of a server configured to perform the server functions described herein.

Turning to FIG. 9, a server 900, configured to perform backend server functions discussed above, is shown. Server 900 includes a processor 910, a memory 920, a hard drive 930, an I/O unit 940, and a network interface 950, all interconnected via system bus 960. System bus may be any type of bus architecture, including memory bus or memory controller, a peripheral bus, or a local bus using any of a variety of bus structure.

Processor 910 is any processor capable of interacting with the variety of components of server 900. In this regard, processor 910 may include a processor, multiprocessors, multicore processor, a dedicated controller, such as an ARM processor, an ASIC, or an FPGA, or any combination thereof. According to some examples, processor 910 is configured to receive login credentials as part of a login procedure; transmit the received login credentials to a first server for an authentication check; receive a result of the authentication check from the first server; and transmit a first token and a first share to a first device when the authentication check indicates that the received login credentials are valid.

Memory 920 is system memory that includes ROM 921, RAM 922, BIOS 923, OS 924, server-side application 925, and application data 926. The information stored in memory 920 is accessible by processor 910. In preferred embodiments, server-side application 925 is a secure collaboration application that allows users to participate in voice and video calls, share encrypted content, exchange encrypted communications, and share application data via the corresponding client-side application on the users' devices. Accordingly, the processes described above are performed by the secure collaboration application executing on server 900. In operation, the secure collaboration application and the hardware of server 900 operate in conjunction to perform the processes described herein. Accordingly, memory 920 may be any type of media capable of storing information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 920 may include short-term or temporary storage, as well as long-term or persistent storage.

Application data 926 includes a database that stores at least one of account information for one or more users, encrypted communications, etc. In preferred embodiments, application data 926 is encrypted via an encryption algorithm, such as Advanced Encryption Standard (AES), and a 256-bit key, referred to hereinafter as a server encryption key.

Hard disk drive 930 is a non-volatile memory configured to store operating system 934, server-side application 935, and application data 936 prior to being loaded into memory 920. In preferred embodiments, application data 936 is encrypted using a symmetric encryption algorithm and a server encryption key.

I/O unit 940 is configured to receive input from a user and output data to the user. As illustrated I/O unit 940 receives input from mouse 942 and keyboard 944. While mouse 942 and keyboard 944 are illustrated, a skilled artisan would appreciate that I/O unit 940 is capable of interacting with a plurality of different input and output devices, including touchpads, monitors, printers, etc. According to some embodiments, I/O unit 940 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Network interface 950 may be dedicated hardware, software, firmware, or any combination thereof that is configured to connect client device server 900 to network 125. In this regard, network interface 950 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 950 is configured to exchange information and data with at least one of a first device and a second server.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A method for securing a first encryption key, the method comprising:
    receiving, by a first device, login credentials as part of a login procedure;
    transmitting, by the first device, the received login credentials to a first server to be authenticated, wherein the first server is a single sign-on system;
    receiving, by the first device, a result of the authentication check from the first server;
    generating, by a first device, a first encryption key;
    encrypting, by the first device, application data using the first encryption key;
    storing the encrypted application data in a memory of the first device;
    dividing, by the first device, the first encryption key into at least a first share and a second share;
    transmitting, by the first device, at least one of the first share to a trusted third party;
    removing, from the first device, the at least one of the first share transmitted to the trusted third party; and
    storing at least one of the second share in the memory of the first device.

2. The method of claim 1, comprising:
    receiving, by the first device, a first token from the first server when the received login credentials are valid.

3. The method of claim 2, comprising:
    transmitting, from the first device, the first token to one or more second servers, wherein the one or more second servers provide access to one or more applications;
    accessing, by the first device, the one or more applications provided by the one or more second servers.

4. The method of claim 1, comprising:
    receiving, by the first device, at least one of the first share from the first server when the received login credentials are valid.

5. The method of claim 4, comprising:
    retrieving the at least one of the second share from the memory of the first device;
    deriving, by the first device, the first encryption key using the first share received from the first server and the second share retrieved from the memory of the first device;
    decrypting, by the first device, the application data using the derived first encryption key.

6. The method of claim 5, comprising:
    receiving, by the first device, a first token with the at least one of the first share;
    transmitting, by the first device, the first token to one or more second servers, wherein the one or more second servers provide access to one or more applications;
    accessing, by the first device, the one or more applications provided by the one or more second servers using the decrypted application data.

7. The method of claim 1, wherein dividing the first encryption key into at least a first share and a second share comprises:
    generating, by the first device, a first random string, wherein the first random string is the first share;
    performing, by the first device, a Boolean operation on the first encryption key using the first random string, wherein a result of the Boolean operation is the second share.

8. The method of claim 7, wherein the Boolean operation is an XOR function.

9. The method of claim 1, wherein the application data is a second key.

10. The method of claim 9, further comprising: encrypting by the first device, a database using the second key.

11. A computing device comprising:
one or more processors; and
memory storing instructions that, when executed by the one or more processors, cause the computing device to:
receive login credentials as part of a login procedure;
transmit the received login credentials to a first server to be authenticated, wherein the first server is a single sign-on system;
receive a result of the authentication check from the first server;
generate a first encryption key;
encrypt application data using the first encryption key;
store the encrypted application data in a memory;
divide the first encryption key into at least a first share and a second share;
transmit at least one of the first share to a trusted third party;
remove the at least one of the first share transmitted to the trusted third party; and
store at least one of the second share in the memory.

12. The computing device of claim 11, wherein the instructions, when executed by the one or more processors, further cause the computing device to:
receive a first token from the first server when the received login credentials are valid;
transmit the first token to one or more second servers, wherein the one or more second servers provide access to one or more applications; and
access the one or more applications provided by the one or more second servers.

13. The computing device of claim 11, wherein the instructions, when executed by the one or more processors, further cause the computing device to:
receive at least one of the first share and a first token from the first server when the received login credentials are valid;
retrieve the at least one of the second share from the memory;
derive the first encryption key using the first share received from the first server and the second share retrieved from the memory;
decrypt the application data using the derived first encryption key;
transmit the first token to one or more second servers, wherein the one or more second servers provide access to one or more applications; and
access the one or more applications provided by the one or more second servers using the decrypted application data.

14. The computing device of claim 11, wherein the instructions, when executed by the one or more processors, further cause the computing device to:
generate a first random string, wherein the first random string is the first share;
perform a Boolean operation on the first encryption key using the first random string, wherein a result of the Boolean operation is the second share.

15. A non-transitory computer-readable medium comprising instructions that, when executed, perform the steps of:
receiving login credentials as part of a login procedure;
transmitting the received login credentials to a first server to be authenticated, wherein the first server is a single sign-on system;
receiving a result of the authentication check from the first server;
generating a first encryption key;
encrypting application data using the first encryption key;
storing the encrypted application data in a memory;
dividing the first encryption key into at least a first share and a second share;
transmitting at least one of the first share to a trusted third party;
removing the at least one of the first share transmitted to the trusted third party; and
storing at least one of the second share in the memory.

16. The non-transitory computer-readable medium of claim 15, wherein the instructions, when executed, perform the steps of:
receiving a first token from the first server when the received login credentials are valid;
transmitting the first token to one or more second servers, wherein the one or more second servers provide access to one or more applications; and
accessing the one or more applications provided by the one or more second servers.

17. The non-transitory computer-readable medium of claim 15, wherein the instructions, when executed, perform the steps of:
receiving at least one of the first share and a first token from the first server when the received login credentials are valid;
retrieving the at least one of the second share from the memory;
deriving the first encryption key using the first share received from the first server and the second share retrieved from the memory;
decrypting the application data using the derived first encryption key;
transmitting the first token to one or more second servers, wherein the one or more second servers provide access to one or more applications; and
accessing the one or more applications provided by the one or more second servers using the decrypted application data.

18. The non-transitory computer-readable medium of claim 15, wherein the instructions, when executed, perform the steps of:
generating a first random string, wherein the first random string is the first share;
performing a Boolean operation on the first encryption key using the first random string, wherein a result of the Boolean operation is the second share.

19. The non-transitory computer-readable medium of claim 18, wherein the Boolean operation is an XOR operation.

20. The non-transitory computer-readable medium of claim 15, wherein the application data is a second key used to encrypt a database.

* * * * *